United States Patent [19]

Clark

[11] 4,358,377
[45] Nov. 9, 1982

[54] SHEAR-VECTORING DESIGN FOR COMPOSITE CASING END AND REMOVABLE, PRESSURE-LOCKING CLOSURE THEREFOR

[75] Inventor: George B. Clark, Clayton, Calif.
[73] Assignee: The Dow Chemical Company, Midland, Mich.
[21] Appl. No.: 183,663
[22] Filed: Sep. 2, 1980
[51] Int. Cl.³ .............................................. B01D 31/00
[52] U.S. Cl. .............................. 210/323.2; 210/433.2; 210/450; 210/451; 210/455; 210/478; 277/27; 220/3; 220/67; 220/319; 285/254; 285/423; 285/DIG. 20
[58] Field of Search ...................... 277/3, 27, 135, 166, 277/181, 186; 285/37, 254, 423, 321, DIG. 20; 210/321, 323.2, 433.2, 450, 451, 455, 477, 478; 55/158; 422/48; 220/3, 67, 319; 29/596

[56] References Cited

U.S. PATENT DOCUMENTS

| | | | |
|---|---|---|---|
| 986,081 | 3/1911 | Patterson | 285/254 X |
| 3,318,620 | 5/1967 | Cullen et al. | 285/254 X |
| 3,851,786 | 12/1974 | Kaempen | 220/3 |
| 3,893,878 | 7/1975 | Kaempen | 156/161 |
| 3,915,776 | 10/1975 | Kaempen | 156/161 |
| 3,957,416 | 5/1976 | Kaempen | 425/470 |
| 3,957,648 | 5/1976 | Roget et al. | 210/321.5 |
| 4,061,366 | 12/1977 | Affa | 285/37 |

OTHER PUBLICATIONS

Kaempen TFRP Pressure Tubes (4 In. I.D. Fiberglass Pressure Tubes), available prior to 9/02/80, Kaempen Ind. Inc. 30005, Croddy Way, Santa Ana, Calif. 92704.

Primary Examiner—David R. Sadowski
Attorney, Agent, or Firm—R. R. Stringham

[57] ABSTRACT

An improved combination of an open-ended casing section and a removable closure inset therein is disclosed. The casing section is of composite structure and comprises an annular bulge of bowed fiber sections which, together with underlying annular resin bodies, defines a groove in the inner surface of the casing section. The latter section is improved by incorporation of circumferentially wound fibers in the latter resin bodies and by a hoop of resin-coated fibers wound around the casing section between the apex of the bulge and the casing end. The closure assembly is improved by use of a head having an annular concavity in which is seated a retaining ring adapted to fit into the groove in the inner surface of the casing section when the head is urged toward the casing end.

6 Claims, 4 Drawing Figures

SHEAR-VECTORING DESIGN FOR COMPOSITE CASING END AND REMOVABLE, PRESSURE-LOCKING CLOSURE THEREFOR

BACKGROUND OF THE INVENTION

Removeable closures for fiber/resin casing ends conventionally comprise a head which fits closely in the casing and is held in place by a segmented retaining plate or a snap ring inserted in an annular groove machined in the inner surface of the casing. When the closed casing is internally pressurized, the pressure force transmitted from the head to the casing (through the retaining plate or ring) is countered by the resistance of the casing end to delamination. As a result of cutting the annular groove, the fiber portions between it and the casing end no longer extend into the casing wall and delamination is resisted only by the shear strength of the resin between the outermost of the latter, short fiber portions and the composite structure surrounding them. That is, for failure to occur, it is only necessary to push out the (cylindrical) portion of the casing end comprising the severed fiber ends. No benefit is realized in this regard from the inherent tensile (and shear) strength of the fibers themselves. Such failure can be prevented by abutting the casing end against a suitably supported cage—or cradle—end but the advantages of composite materials as to light weight and space utilization will thereby be substantially negated.

The foregoing problem is largely avoided by a prior design (of the present inventor) illustrated in FIG. 3 of the drawings. This design has not previously been disclosed but was embodied in a commercially utilized utrafiltration device. In the latter design, the groove for the retaining plate is formed, not by cutting, but by bowing the (resin-coated) fibers over an annular bulge in the preform on which they are wound. The spaces next to the bulge, between the bowed fiber portions and the pre-form, are filled (after the form is removed) with an epoxy (or other) resin. A segmented retaining ring is employed.

The latter design vectors the forces so they are resisted by the shear strength of the fibers themselves and is highly satisfactory for many applications. However, it is considered not to provide adequate strength for relatively large diameter casings to be subjected to internal pressures of the magnitude commonly required for reverse osmotic desalination of saline waters.

OBJECTS OF THE INVENTION

The main object of the present invention is to extend the utility of the above-described design to devices intended to be operated at typical reverse osmosis process pressures, without diminishing the extent to which the advantages of composite casing materials are realized.

A further object is to effect the required improvement in a manner which does not require equipment or materials other than those used in conventional manufacture of casings from composite materials.

An additional object is to provide a casing/head/retaining ring assembly which is designed to facilitate removal of the ring but also to provide for automatic, very secure locking of the ring in place when the casing is internally pressurized.

Another object is to effect substantial cost and weight reductions in casing end-closure assemblies.

Still other objects will be made apparent to those skilled in the art by the following specifications and claims.

SUMMARY DESCRIPTION OF THE DRAWINGS

Figure 3:
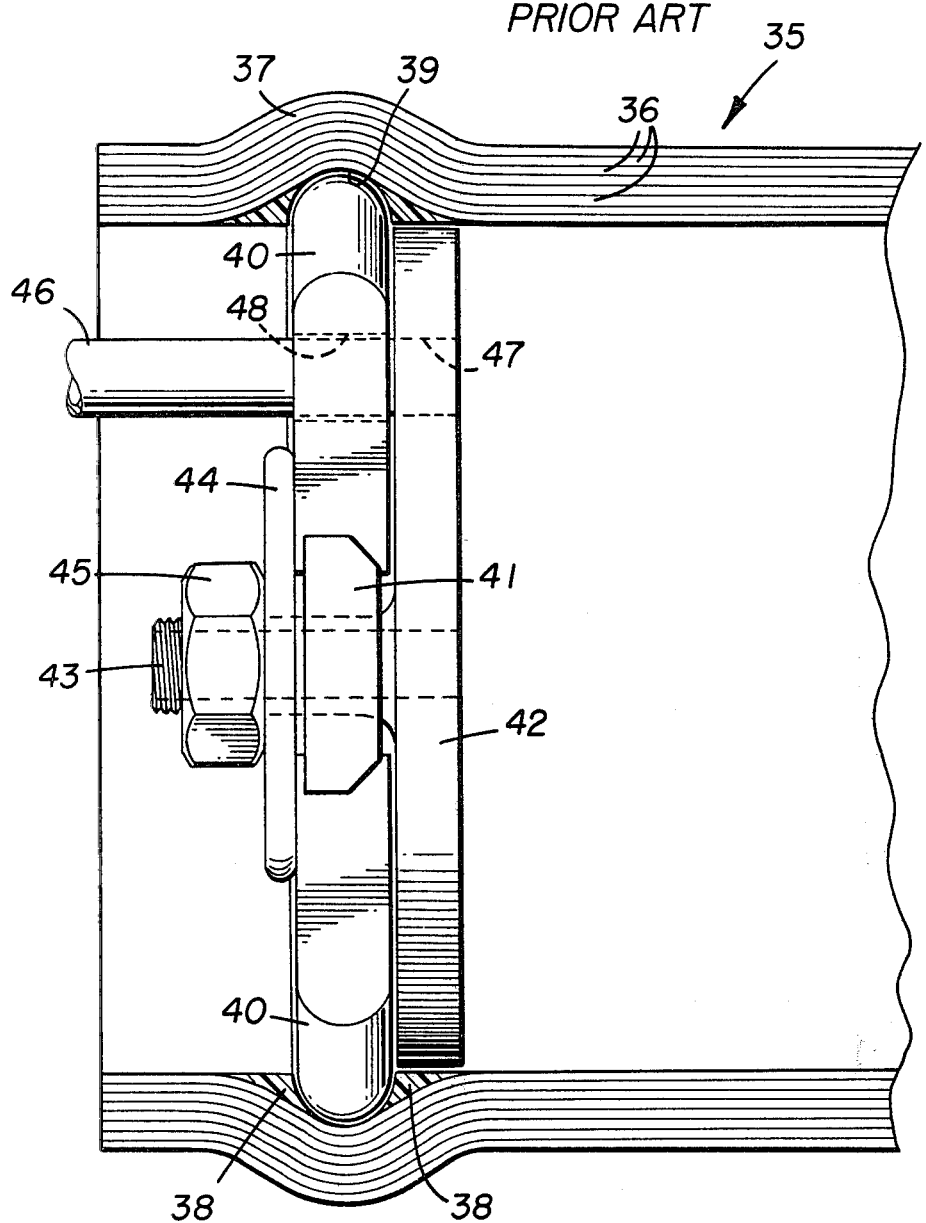

In FIG. 3, the end portion of a casing surrounding a closure assembly is shown cut in half longitudinally to expose the closure assembly—a portion of which has been removed. The depicted casing closure combination is a commercially used type over which the present invention is an improvement.

Figure 4:
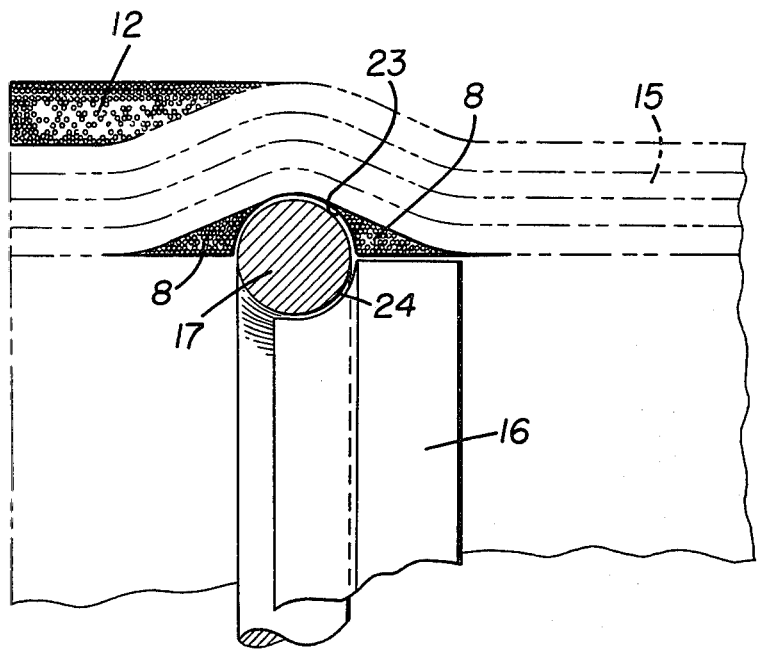

FIG. 4 is an enlarged, partial cross-section showing the relationship of the new and modified elements to the old elements in the improved combination of the invention.

SUMMARY OF THE INVENTION

The present invention is an improved combination of an open-ended casing section having a head/retaining ring assembly assembled therein and constituting a closure inset from said end, said section being formed of resin-coated fibers and having an annular bulge defined by portions of said fibers outwardly bowed over a pair of annular hoops of circumferentially wound resin-coated fibers, said hoops being of generally triangular cross-section and defining between them a groove, in the inner surface of the casing-end, of generally semi-circular cross-section, and the portion of said casing section between said end and the apex of said bulge being encircled by a hoop of circumferentially wound, resin-coated fibers;

said head having inner and outer faces and a peripheral surface connecting them, the junction of said surface and said outer face defining an annular concavity adapted to receive said ring and the portion of said surface between said concavity and said inner face being adapted to slidingly engage said interior surface of said casing, and said ring having a cross-sectional shape conforming to said groove and to said concavity and being so disposed therein that when said head is urged toward said casing end, the ring is locked in place.

The invention also comprises the following process, i.e., the method of fabricating the above-defined combination which comprises:

(1) providing a casing pre-form having an annular bulge-defining element of generally semi-circular cross-section, at least the latter element of the preform being removable after the casing is formed, (2) forming a pair of annular hoops of generally triangular cross-section by circumferentially winding resin-coated fibers on said pre-form on each side of the bulge, (3) helically winding resin-coated fibers over said pre-form and said hoops to form an open-ended casing section, thereby bowing the portions of the helically-wound fibers passing over said bulge, in conformation to the bulge and hoops, thereby forming a corresponding bulge in the casing wall and an underlying groove, of generally semi-circular cross-section, in the interior surface of the casing section, (4) forming a hoop of circumferentially wound fibers between the end of the casing section and the apex of the latter bulge, (5) removing at least the bulged section of the pre-form, (6) disposing, interiorally of said groove, a head having an inner face and an outer face and a peripheral surface joining said faces, the portion of the latter surface between said concavity and said inner face being slidingly engaged with the interior surface of said casing section, the juncture of said outer face and said peripheral surface defining an annular concavity adapted to receive a retaining ring, (7) inserting in said groove a ring adapted to be received in the groove and to conform to said concavity, and (8) urging said head toward said casing end, thereby locking the ring between the head and the casing section.

It should be noted that as used herein, the term " . . . wound, resin-coated fibers" but also to wound fiber composites in general, without regard for the sequence in which resin application and winding are accomplished. It should also be noted that the use of pre-forms of which the groove-forming, bulged section or element is separately removable is contemplated (pre-form assemblies adapted for this can readily be devised without further invention).

The term "casing section" is intended to apply not only to a section of a casing which is entirely formed of a fiber/resin composite but also to a composite section joined to a casing body otherwise constructed. It is, however, highly preferred that the casing comprising the section be formed as a unitary composite construct.

DETAILED DESCRIPTION

Figure 1:
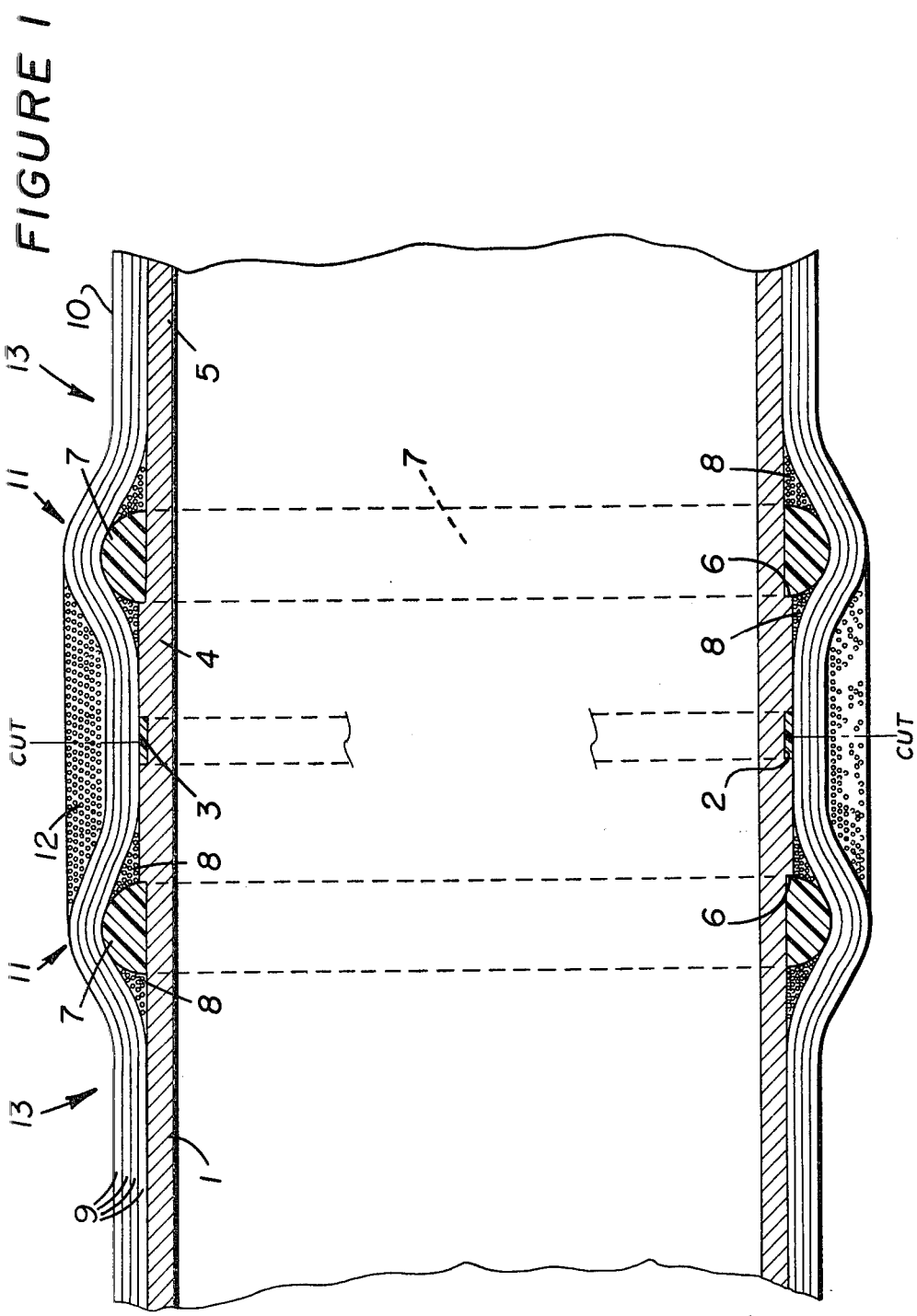
FIG. 1 is a longitudinal cross-sectional view of the ends of two, as yet unseparated casings wound as a unit on a single pre-form and adapted for use in the combination of the present invention.

Referring to FIG. 1, the middle portion (1) of a cylindrical metal pre-form is cut to define an annular groove (2) in its outer surface and an expendable plastic hoop (3) is fitted (or formed) in the groove. The groove is centered in a section (4) of the pre-form wall which is of increased thickness and, at the junction with the sections (5) of lesser thickness, defines two annular shoulders ((6); size exaggerated in drawing). Two bulges are formed in the outer surface of the pre-form by emplacement thereon of two closely fitting TEFLON ® rings (7) which are put in at opposite ends (not shown) of the pre-form and slipped toward each other until positioned against the shoulders (6). An annular hoop (8) of generally triangular cross-section is formed, on each side of each of rings (7), of circumferentially wound, resin-coated fibers. Resin-coated fibers (9) are then wound on the pre-form in the conventional manner to build up an uncured casing (10) having two spaced-apart annular bulges (indicated generally as (11)). (It should be noted that the latter fibers are shown, to simplify the drawing, as disposed generally parallel to the longitudinal axis of the pre-form but in fact are disposed as layered, crisscrossing helical winds.) The annular space between the bulges in the casing is then filled with a hoop (12) of circumferentially wound, resin-coated fibers. The resin in the casing and hoops is cured and the casing (including hoop (12)) is cut as indicated in the center plane normal to the pre-form axis, thereby producing two open-ended casings (casing-halves; indicated generally as (13)), the open end of each being contiguous with a half of hoop (12). Each casing, together with the ring (7) held in its bulge, is slipped off the pre-form. The ring is sprung out of each casing, leaving an annular groove (not separately numbered) therein, adapted to receive a retaining ring of circular cross-section.

The above-described procedure constitutes the best known process mode of the present invention.

Figure 2:
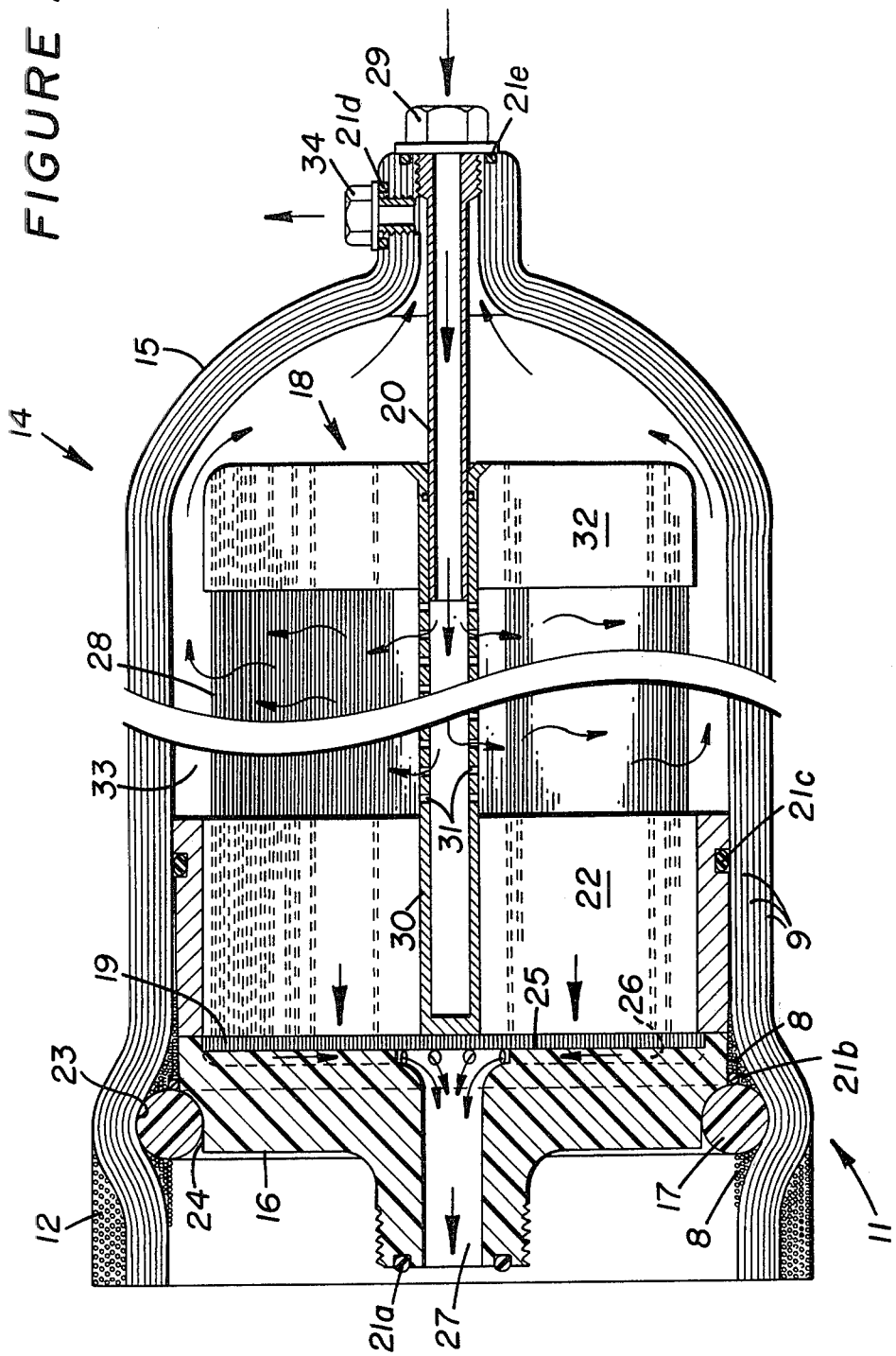
FIG. 2 is a longitudinal cross-sectional view of a reverse osmosis desalination device utilizing a casing-end closure combination of the present invention.

Utilization of a casing of the latter type in a reverse osmosis module is illustrated in FIG. 2. The module (indicated generally as (14)) comprises six main components: the casing (15), a head (16), a retaining ring (17), a hollow fiber/tubesheet and core assembly (indicated generally as (18)), a porous tubesheet support (19) and a feed tube (20). In addition, the module comprises five O-ring seals (21a-e) seated in corresponding (unnumbered) grooves in the head, the casing, the working tubesheet (22) and the feed end of the casing, respectively.

Those elements (the annular bulge (11), and the cylindrical hoops (8) and (12)) of the casing end closed by the head/ring assembly are numbered as in FIG. 1; so are the helically wound fibers (9) comprised in the casing.

Ring (17) is a flexible but strong ring of suitable composition and structure and is emplaced in (or removed) from) its position between the annular concavity ((23); under bulge (11)) and the opposed concavity (24) in the head after moving the head, tubesheet support and tubesheet/fiber assembly axially toward the inlet end of the casing and then in the reverse direction (the casing interior of course not being pressurized at the time; when the interior is pressurized, the head is forced against the ring and locks it in place).

The inner face (25) of head (16) is cut by radial grooves (26); some of these grooves are shown (in phantom, except at their terminations in the belled end of the product (permeate) discharge bore (27)). The grooves collect the permeate (water, ordinarily) passing through the porous support disc (19) (a sintered metal or ceramic powder disc, for example) from the open ends of the hollow fibers ((28); only a few shown) passing through (and sealingly engaged with) a body of resin constituting the "working" tubesheet (22).

When the module (14) is in operation, an aqueous feed (a brackish water, for example) is introduced, at a pressure in excess of its osmotic pressure (vis-a-vis water) to inlet (29), passes through tube (20) into core (30) (slidingly engaged with the latter tube) and out through the perforations (31) into the spaces between the fibers. Water permeates through the semi-permeable fiber walls into the fiber lumens (not numbered). The lumens terminate in open ends in the plane of the tubesheet face (not numbered) in contact with the support disc (19) and are closed at their other ends, which are potted in the non-working or "dead" tubesheet (32). The concentrated feed (the "reject") exits from the bundle into the space (33) between it and the casing wall and flows as indicated to the outlet fitting (34) and out of the module.

A variety of hollow fiber/tubesheet/core assemblies and tubesheet support means which may be employed together in modules of the preceding construction are now so well known as not to require extensive documentation. Reverse osmosis ("R.O.") modules constitute the presently most preferred application of the present invention.

Similarly, methods of making composite casings by winding resin-coated or resin-impregnated fibers of various types on forms are also quite well known. The fiber hoops devoted as elements (8) in FIGS. 1 and 2 are formed before the casing wall proper is wound, but this does not necessitate utilization of separate fiber tows;

the winding angle (relative to the longitudinal axis of the pre-form) can be altered without interrupting the tow (or the operation). The same applies to the subsequent formation of the hoop (12) between the annular bulges in the structure illustrated in FIG. 1.

It should be noted that provision for the groove in which the O-ring ((21b), FIG. 2) will be seated should be made prior to winding the casing. This is readily done by appropriately modifying the shape of the form rings ((17), FIG. 1). For reasons which will be apparent to those knowledgeable in the art, it is not desirable to form the sealing groove by machining. The other O-ring grooves in the head (and casing) can be formed by conventional methods.

The head may be fabricated by any convenient method from any strong, corrosion-resistant materials. Of such materials, those—such as reinforced plastics, for example—which are both lightweight and amenable to casting procedures—are preferred.

The most preferred form of retaining ring is a compressible helical coil of spaced-apart turns wound from a length of flat spring stock (such as steel, for example). Since this type of ring can be designed to be (almost) fully compressed when disposed in its normal operating location relative to the head and casing, it acts to "spring-load" the head so that inward displacement of the head (etc.) for removal of the ring is facilitated. Yet, when the head moves outward (i.e, when the casing is internally pressurized,) the ring is compressed and is securely locked in place by frictional engagment, in a manner similar to the action of a locking washer, with the surfaces it is seated against. If desired, however, such a ring can be sized to provide pressure relief by yielding at a given over-pressure.

Tubesheet support means suitable for employment in R.O. modules utilizing the present invention are disclosed in U.S. Pat. No. 3,702,658 (E. I. duPont de Nemours & Co.). However, any other structure of adequate compressive strength and affording adequate surface contact with the tubesheet face but not excessively hindering egress of permeate from the fiber lumens may be employed for this purpose. Of course, the inner face of the head in each case will be adapted to cooperate effectively with the support means employed to provide for permeate egress.

The differences between the previously used casingend/closure-assembly combination and the improved version constituting (or comprising) the present invention will now be examined in more detail.

The previously used combination is shown in FIG. 3. A composite casing end (35) comprising bias-wound (or helically-wound), resin-coated fibers ((36); shown for simplification as parallel to the casing axis) comprises an annular bulge (37) of bowed fibers (and resin) overlying two cured, annular resin bodies (38) of generally triangular cross-section which define between them a groove (39) of semi-circular cross-section in which (in the complete casing end) are seated four disc segments (40), each having the general shape of an annular sector (one segment removed and one not visible, in the figure) which bear against the sides of a centrally disposed, tightly fitting, square locking nut (41). The disc segments and the latter nut constitute the retaining "ring" (or disc) for the closure assembly. A stainless steel back-up plate (42) which may also be considered a "head" has welded to it a threaded, stainless steel pipe length (43) over which nut (42) and a heavy gauge washer (44) slip easily. The closure assembly is locked rigidly together by tightening down a nut (45) threaded onto the pipe length. A length of conduit (46) is shrunk-fit in a bore (47) through plate (42) and passes through an aligned bore (48) in one of the disc segments (40).

The improvement(s) in the latter combination are illustrated in FIG. 4 (the elements shown being numbered as in FIG. 2). The casing end has been greatly strengthened by the addition of the wound hoop (12) and the wound hoops (8), the latter replacing the resin bodies (38) in FIG. 3. The segmented retaining disc (etc.) in FIG. 3 has been replaced by the toroidal ring (17) which is seated not only in the groove (23) in the casing but also in a concavity (24) defined by the junction of the outer face and the peripheral surface of a head (16) which is slidingly engaged with the inner surface of the casing and is urged against the retaining ring when the casing is internally pressurized. Thus, a significant simplification of the closure assembly is accomplished and disassembly and removal of it facilitated. That is, two elements (the ring and head) not only accomplish the closure function of elements (40)-(45) (9 pieces) in FIG. 3 but also provide for self-locking (by internal pressure forces) and rapid, easy unlocking (by depressurization) and disassembly. Furthermore, the improved closure assembly is simpler to fabricate and utilizes substantially lighter and less expensive materials.

Those skilled in the art will recognize that a number of variations in the above-disclosed structures and procedures are implicit in the preceding Summary of the Invention.

Thus, for example, although highly preferred, it is not necessary to form a multiple-length casing closed at both ends and then to cut it in two or more portions. If desired, a single, open-ended casing at a time can be formed (in a manner which will be apparent).

Casing sections open at both ends of course can be closed by means of two closure-assemblies of the invention. The lightweight and simplicity of the latter closures are of particular value in applications where it is desirable to be able to open both ends of the casing.

Similarly, when the entire pre-form is to be removed from the casing, it may be either collapsible or non-collapsible. Again, the form ring (the "bulged-section" of the pre-form) may either be flexible, and therefore removable by snapping it out, or segmented or collapsible.

It will also be apparent that the fibers employed in either or both the helical and circumferential wraps may be either solid or hollow and can consist of any material of suitable strength and flexibility, such as glass, graphite, metal, etc. Glass fiber pre-preg is presently preferred as offering adequate physical properties and being readily available at a relatively low cost.

The specific embodiments of the invention disclosed herein are for purposes of illustration and are not to be construed as limiting the scope of the invention in a manner inconsistent with the following claims.

What is claimed is:

1. In the combination of an open-ended section of an internally pressurizeable casing and a closure assembly therefor, inset from said casing section end, wherein said closure assembly comprises a head, having opposed inner and outer surfaces and a peripheral surface connecting said surfaces, and a retaining means for said head seated in a groove in the interior surface of the casing-section wall, wherein said casing section is formed of helically-wound, resin-coated fibers and said groove is of generally semi-circular cross-section and defined by the adjacent surfaces of a pair of annular resin bodies, of generally triangular cross-section, the portions of said fibers passing over said resin bodies, to said open end, being bowed outwardly in conformation to them and defining an annular bulge, having an apex, in the outer surface of said section, the improvement comprising:

(1) circumferentially wound fibers in said resin bodies, the resin and fibers together constituting hoops of resin-coated fibers, (2) a hoop of resin-coated fibers circumferentially wound around the portions of the helically-wound fibers between said casing-section end and the apex of said bulge, (3) as said retaining means, a ring, and (4) an annular concavity in said head defined by the juncture of said outer face and said peripheral surface and adapted to seat against and to lock in position said ring when urged against the same by internal pressurization of said casing, the portion of said surface between said concavity and said inner face being slidingly engaged with the inner surface of said casing section.

2. The combination of claim 1 wherein said casing is formed in its entirety of resin-coated fibers.

3. The combination of claim 1 wherein said ring is a compressible helical coil of spaced-apart turns wound from a length of flat spring stock.

4. The combination of claim 2 wherein said ring is a compressible helical coil of spaced-apart turns wound from a length of flat spring stock.

5. The combination of claim 1 when said casing is pressurized, thereby urging said head against said ring and locking said closure assembly within said casing section.

6. The combination of claim 1, as part of a reverse osmosis device in which said inner face of the head is in contact with a fluid-permeable tubesheet support means intervening between said face and a face of a tubesheet through which pass in sealing engagement therewith a plurality of hollow fibers, the lumens of which terminate in and open onto said tubesheet face, said inner face of the head being adapted to receive and convey, to a discharge means, fluid passing from said fiber lumens through said support means.

* * * * *

UNITED STATES PATENT AND TRADEMARK OFFICE
CERTIFICATE OF CORRECTION

PATENT NO. : 4,358,377
DATED : November 9, 1982
INVENTOR(S) : George B. Clark

It is certified that error appears in the above—identified patent and that said Letters Patent is hereby corrected as shown below:

Column 1, line 35, "ultrafiltration" is misspelled;

Column 3, line 21, after "fibers"" insert -- is intended to apply not only to conventional "pre-pregs" --;

Column 4, line 17, delete the comma after "(11)";

Column 4, line 22, delete the closing parenthesis after "removed";

Column 5, line 10, delete "((17)" and insert -- ((7) --;

Column 5, line 30, "engagement" is misspelled.

Signed and Sealed this

Fifteenth Day of March 1983

[SEAL]

Attest:

GERALD J. MOSSINGHOFF

Attesting Officer

Commissioner of Patents and Trademarks